Patented Apr. 19, 1927.

1,625,301

UNITED STATES PATENT OFFICE.

BERNARD F. ERDAHL, OF DULUTH, MINNESOTA.

PROCESS OF PRODUCING ALGIN COMPOUNDS AND PRODUCTS DERIVED THEREFROM.

No Drawing. Application filed July 20, 1926. Serial No. 123,808.

My invention relates to the production of an aged algin intermediate, and the preparation of fortified alginates and the decomposition products formed by the elimination of a volatile radical from the fortified alginates. Specifically, my invention relates to the preparation of fortified ammonium alginates and the decomposition products formed by the elimination of the volatile ammonium radical.

In order to prepare the raw algin material, algin is abstracted from sea weeds in such a form as to dissolve in cold water and form a collodial solution. For example, the comparatively pure alkali or alkaline base of alginic sea weeds is dissolved in cold water varying in temperature from 32 to 70° F. producing a collodial solution. The concentration and viscosity of the colloidal solution may vary according to circumstances. However, most satisfactory results for subsequent processing are obtained when using a ten per cent colloidal solution of an algin base. Sodium alginate serves admirably as a basic raw material. The sodium alginate should be relatively pure, as free from cellulose as possible. Such inorganic impurities as remain are generally removed in the subsequent acid treatment.

In carrying out my invention, a colloidal solution of an algin base prepared as above described, for example, a ten per cent collodal solution is treated with an acid which hydrolyses or dissociates to a great degree. The colloidal solution of the algin base may be prepared by dissolving 300 pounds of dry sodium alginate in 3000 pounds of water. The colloidal solution is preferably an alkali metal solution of an alginate. Other soluble algin bases are suitable but sodium alginate is the preferred raw material. Hydrochloric, nitric, or sulfuric acid may be used as the precipitating medium. The most satisfactory results are obtained with a dilute solution of sulfuric acid, and it is of considerable importance that the concentration of the acid be of the proper degree. For practical purposes, the concentration of the acid may vary between a 17% to a 9% solution by volume depending on the time of the digestion of the precipitate produced by adding a collodial sodium alginate solution to an acid bath. I have found that satisfactory results may be obtained by adding to the 10% alginate solution, which, as stated, is prepared by treating 300 pounds of dry sodium alginate with 3000 pounds of water, 425 gallons of dilute sulphuric acid. This is more than sufficient to react with the alginate. About half of the sulphuric acid is spent in one precipitation, the other half being recovered and used over again for the next concentration, fresh sulphuric acid being added thereto, if necessary.

In effecting the solution of the colloidal sodium alginate in the acid bath, it is a necessary precaution to keep both the colloidal solution of the alginate and the acid bath cool. A temperature ranging between 32 and 70° F. is satisfactory. The colloidal alginate solution is fed into a nozzle constructed so as to provide a thin wide ribbon of colloidal sodium alginate as it leaves the nozzle. The ribbon of the cold sodium alginate, as it comes from the nozzle, is gaged with the acid on leaving the nozzle and then dropped into a bath of dilute sulfuric acid and the resulting precipitate retains the ribbon form. The acid bath is slowly stirred as the precipitation is effected. This ribbon precipitate is aged by digestion in the acid bath for a varying period of time, depending upon the strength of the acid used. When the concentration of the sulfuric acid is about 9% by volume, the digestion and aging period is about 24 hours. When a higher acid concentration is used, the digestion and aging period is shorter. In all cases a sufficient quantity of acid should be present to effect a complete reaction. The step of digesting and aging the algin precipitate is an important one as it allows the chemical reaction occurring when the colloidal sodium alginate solution is introduced into the acid bath to be substantially completed. This is essential as I have discovered that incomplete precipitation in the absence of the aging step results in a product which is insoluble in ammonia or in one partially soluble therein. On the other hand, the digested algin resulting from aging in an acid bath gives a product which goes into colloidal solution almost instantly on contact with ammonia.

When the colloidal solution of sodium alginate is introduced into the bath, chemical action occurs and the sodium alginate reacts with the acid. The alginic base adsorbs the metallic hydrogen ion and the sodium is liberated as the sulfate, chlorid. or other salt depending on the nature of the acid used. If hydrogen is considered as a metal, the resulting alginate may be called a metal alginate. After the aging step, the resulting precipitate is washed with cold water to remove the salts and excess precipitating liquor. It is quite important that the precipitate be thoroughly washed and the last traces of impurities removed. The purified precipitate according to an ultimate analysis corresponds to the formula $C_{12}H_{20}O_{14}$. This precipitate is dried by any appropriate means, for example, by centrifugal force until it has a consistency corresponding to 20 to 25% solids.

The alginic acid prepared as set forth may be dissolved directly in ammonium hydroxid or any other solvent in which it will go into colloidal solution. However, in the preferred form of my invention, the use of a fortifying agent is contemplated. The fortifying agent may comprise a vegetable or animal wax or an oil capable of being saponified and emulsified by a medium capable of removal by evaporation.

Specifically, the fortifying agent is prepared as follows: Beeswax is heated with a measured excess of ammonia, until that part of the wax consisting of the fatty acids or other corresponding oils or esters is almost completely saponified. The heating may be carried out in an autoclave or other closed vessel at a temperature varying between 70 and 100° C. The autoclave treatment will effect the saponification of the fatty acids or their corresponding oils or esters and produce an emulsion of the saponifiable and unsaponifiable compounds present. When the mixture is thoroughly saponified and emulsified the semi-liquid is cooled down to about 70° C. and the liquid is gaged on the precipitate of alginic acid in a closed mixer. In the mixer the excess ammonia present in the fortifying mixture dissolves the precipitate of alginic acid forming ammonium alginate. The proportion of the fortifying agent to be added to the alginic acid precipitate may vary in accordance to the uses to which the final product may be applied. Satisfactory results are obtained when five pounds of the alginic acid precipitate is mixed with the emulsion obtained from one pound of wax or oil.

The mixed end product which is ammonium alginate containing the products of decomposition, that is saponification and emulsification products resulting from adding the fortifying agent is soluble in water. On drying, by heating, vacuum treatment, aeration, or the like, this product becomes insoluble as the ammonium alginate decomposes, as do the saponified and other emulsified compounds, the product thereby becoming free of the dispersing agent. Due to the removal of the volatile dispersing agent and the decomposition of the alginate, and the saponified compounds, the end product on application to a pervious material will leave a film that is substantially colorless, non-poisonous, cohesive, adhesive, continuous or non-porous, water repellant and acid resisting.

From the above it will be seen that my invention consists broadly in preparing an algin material by introducing the colloidal solution of an algin base into an acid bath, aging the resulting precipitate in said bath, and recovering the algin reaction product therefrom. This produces an intermediate material from which alginates containing a volatile radical may be prepared. Various algin bases may be used but in the preferred form of my invention, I contemplate using purified sodium alginate. Various acid baths of different concentrations may be used and depending upon the concentration of the acid bath, the period of digestion and aging varies. My invention also consists in mixing the aged algin precipitate with a volatile dispersing agent such as ammonia containing a fortifying agent, but it is to be clearly understood that my invention is not restricted to the use of the particular volatile dispersing agent referred to. It has been set forth as an example because it is the most suitable one to work with. As indicated, the fortifying agent may consist of a saponifiable material dissolved in ammonia, the vegetable and animal waxes or oils serving admirably for this purpose. It is preferred to use beeswax as most satisfactory results have been obtained when using this material. However, other waxes, such as Japan wax and myrtle wax may be used.

The precipitate formed by adding a sodium alginate solution to the acid is a solid, which, after being centrifuged, resembles coarse saw dust. It is not as hard to the touch as saw dust. This material, although it contains 75 to 80% of water, 25 to 20% of solids, only feels slightly moist to the touch. As the material comes out of the bath and before being centrifuged the precipitate contains from 96 to 98% water. This precipitate is a solid colloid.

The material produced by adding the fortifying agent, which, as stated, is an emulsion, to the solid aged alginic acid assumes the form of a thick colloidal solution or paste, somewhat similar to thick molasses. It is so thick that it barely runs. The ammonium alginate produced when using a measured excess of ammonia in the fortifying emulsion gives a glue-like or syrupy compound.

Such a film is adapted to the waterproofing and acid proofing of various materials, when used integrally and as a sizing. The film will withstand the action of the diluted acids and of concentrated acids excepting concentrated sulfuric acid. It may be used as a waterproofing and acid proofing binding adhesive functioning as a water and acid proof glue. It may be used properly diluted with water as a bath for textiles and canvas to render these materials water and acid proof. In the latter case, the articles are usually heated to temperatures ranging between 120° and 140° F. to effect the removal of the water and the volatile ammonium dispersing agent.

Cellular or pervious materials or articles may be treated with the fortified ammonium alginate prepared as described to form a filling, coating, envelope or impregnation of the cellular or pervious materials. The extent to which the filling permeates the cells or interstices of the material and becomes interlocked with the same depends upon the methods used to produce the material and fabricate the article. Both inorganic and organic cellular or semi-cellular and pervious materials may be treated with the fortified ammonium alginate as prepared with conferment thereto of many desirable properties.

The fortified ammonium alginate, as described, may be mixed with or caused to impregnate wood pulp, paper or other cellular or pervious materials either in the raw or finished state. When wood pulp and paper pulp are used to form weather boards, roofing slabs, roofing paper, flooring and similar fabricated articles, it is preferred to add the colloidal fortified ammonium alginate to the material in bulk, before it is manufactured into the desired article, but the finished articles may be treated with the fortified ammonium alginate by simple immersion. In either case, care must be taken to subject the finished composition of matter or article to a thorough drying and gradual heating, in order to decompose the ammonia soaps and liberate ammonia from the ammonium alginate, leaving an insoluble, impermeable, cohesive, adhesive, continuous or non-porous, water repellant and acid resisting film. It is preferred to heat gradually and a maximum temperature of 140° F. has been found satisfactory. Obviously, the degree to which the articles are heated will vary according to circumstances.

The impregnation of the material may be effected or facilitated by any other well known methods, as for instance, slight heating, vacuum impregnation, injection by force under pressure, or the fortified ammonium alginate may be applied by simple soaking or the immersion of the material therein.

The fortified colloidal solution of ammonium alginate prepared as described is suitable for the treatment of materials such as vegetable fibers, fabrics or cotton, jute, flax, silk, wool, inorganic substances such as artificial stone, asbestos, and cementitious mixtures containing asbestos and a filler.

When the colloidal fortified ammonium alginate is added to the material in bulk, the resulting product may be pressed or shaped as desired, by mold-treatment or may be prepared in the form of a slab or in a regular or irregular mass which may be cut, sawed, turned or otherwise manipulated to any desired form or size.

Materials or articles coated with the fortified ammonium alginate possess excellent insulating qualities and for that reason are adapted to a wide variety of uses in electrical arts. As the fortified ammonium alginate as prepared is eminently fitted for absorbing pigments and organic dyes, products made with my ammonium alginate solution may be colored as desired.

My final product is a fortified ammonium alginate gel which on drying loses its volatile ammonium component and leaves an end product that is substantially colorless, non-poisonous, cohesive, adhesive, continuous or non-porous, water repellant and acid resisting.

The fortified colloidal ammonium alginate gel is particularly suitable for the coating and impregnating of all types of paper materials and containers made from the same.

The terms "fortifying" and "fortifying agent", as used in the specification and claims, apply to any material which will offset any defect in the preparation of the final algin product and, in addition, will serve to increase the desirable properties of the film such as impermeability, cohesiveness and, in general, its resistent properties. In general, it may be stated that the term "fortifying agent" is well known in the art, as specifically indicated in my U. S. Patent No. 1,415,324, May 9, 1922.

The expression "alginic acid, which has been aged in an acid bath" is intended to define a material which has been digested in the acid bath for such a period of time as to have the property of going into colloidal solution substantially instantly on contact with the volatile dispersion agent, such as ammonia. By this term I wish to distinguish between my new product and that resulting from simply adding the acid to the algin solution without allowing sufficient time for the reaction to be completed, which is the prior art method of carrying out the reaction.

I claim:

1. The process of preparing an algin material comprising introducing a colloidal solution of an algin base into an acid bath, aging the resultng precipitate in said bath, and recovering the algin reaction product therefrom.

2. The process of preparing an algin material comprising introducing a colloidal solution of an algin base into an acid bath, aging the resulting precipitate in said bath, washing the precipitate with a cold fluid and recovering the algin reaction product.

3. The process of preparing an algin material comprising introducing a colloidal solution of an algin base into a dilute sulfuric bath, aging the resulting product in said bath and recovering the algin reaction product.

4. Alginic acid which has been aged in an acid bath.

5. The process of preparing ammonium alginate comprising treating an algin base with a dilute acid bath which highly hydrolyzes, aging the resulting precipitate in said bath, washing the precipitate to remove the impurities therefrom, and dissolving the precipitate in a volatile dispersing agent.

6. The process of preparing ammonium alginate comprising treating an algin base with a dilute acid bath which highly hydrolyzes, aging the resulting precipitate in said bath, washing the precipitate to remove the impurities therefrom, and dissolving the precipitate in ammonia.

7. The process of preparing ammonium alginate comprising treating an algin base with a dilute sulfuric acid bath, aging the resulting precipitate in said bath, washing the precipitate to remove the impurities therefrom, and dissolving the precipitate in a volatile dispersing agent.

8. The process of preparing ammonium alginate comprising treating an algin base with a dilute sulfuric acid bath, aging the resulting precipitate in said bath, washing the precipitate to remove the impurities therefrom, and dissolving the precipitate in ammonia.

9. The process of preparing a fortified alginate comprising treating an algin base with a dilute acid bath which highly hydrolyzes, aging the resulting precipitate in said bath, washing the precipitate to remove the impurities therefrom, and mixing the precipitate with fortifying compounds emulsified in a volatile dispersing agent carrying an excess of the dispersing agent adapted to be removed on drying of the fortified alginate.

10. The process of preparing a fortified alginate comprising treating an algin base with a dilute sulfuric acid bath, aging the resulting precipitate in said bath, washing the precipitate to remove the impurities therefrom, and mixing the precipitate with fortifying compounds emulsified in a volatile dispersing agent carrying an excess of the dispersing agent adapted to be removed on drying of the fortified alginate.

11. The process of preparing fortified ammonium alginate comprising treating an algin base with a dilute acid which highly hydrolyzes, aging the resulting precipitate in said bath, washing the precipitate to remove the impurities therefrom, and mixing the precipitate with fortifying compounds emulsified in an ammonium dispersing agent carrying excess ammonia adapted to be removed on drying of the fortified alginate.

12. The process of preparing fortified ammonium alginate comprising treating an algin base with a dilute sulfuric acid bath, aging the resulting precipitate in said bath, washing the precipitate to remove the impurities therefrom, and mixing the precipitate with fortifying compounds emulsified in an ammonium dispersing agent carrying excess ammonia adapted to be removed on drying of the fortified alginate.

13. The process of preparing fortified ammonium alginate comprising treating an algin base with a dilute sulfuric acid bath, aging the resulting precipitate in said bath, washing the precipitate to remove impurities therefrom, and mixing said precipitate with a fortifying agent comprising a saponifiable material emulsified in a volatile dispersing agent.

14. The process of preparing fortified ammonium alginate comprising treating an algin base with a dilute sulphuric bath, aging the resulting precipitate in said bath, washing the precipitate to remove impurities therefrom, and mixing said precipitate with a fortifying agent comprising a saponifiable material emulsified in ammonia.

15. Aged alginic acid dissolved in ammonia.

16. Aged alginic acid dissolved in ammonia and carrying a fortifying agent.

17. Purified aged alginic acid mixed with a fortifying emulsion carrying ammonia.

18. Aged alginic acid mixed with a wax emulsion.

19. Aged alginic acid mixed with an emulsion of bees wax.

20. Aged alginic acid mixed with an ammonia emulsion of wax.

21. Aged alginic acid mixed with an ammonia emulsion of bees wax.

22. Purified aged alginic acid mixed with an ammonia emulsion of bees wax.

23. As a new article of manufacture, a pervious or cellular material carrying the decomposition products produced by impregnating the material with a purified aged alginic acid mixed with a fortifying agent.

24. As a new article of manufacture, a pervious or cellular material carrying the decomposition products produced by impregnating the material with a purified aged alginic acid mixed with a fortifying emulsion carrying ammonia, and removing the ammonia.

25. As a new article of manufacture, a cellular or pervious material carrying a cohesive, adhesive, continuous impermeable filling or film resulting from the treatment with aged alginic acid mixed with a fortifying agent containing an ammonia emulsion of beeswax, and removing the ammonia.

In testimony whereof he hereunto affixes his signature.

BERNARD F. ERDAHL.